Nov. 17, 1931.   F. P. McBERTY   1,832,719
COMBINED ELECTRIC WELDER AND FLASH STRIPPER
Filed Aug. 7, 1930   8 Sheets-Sheet 4
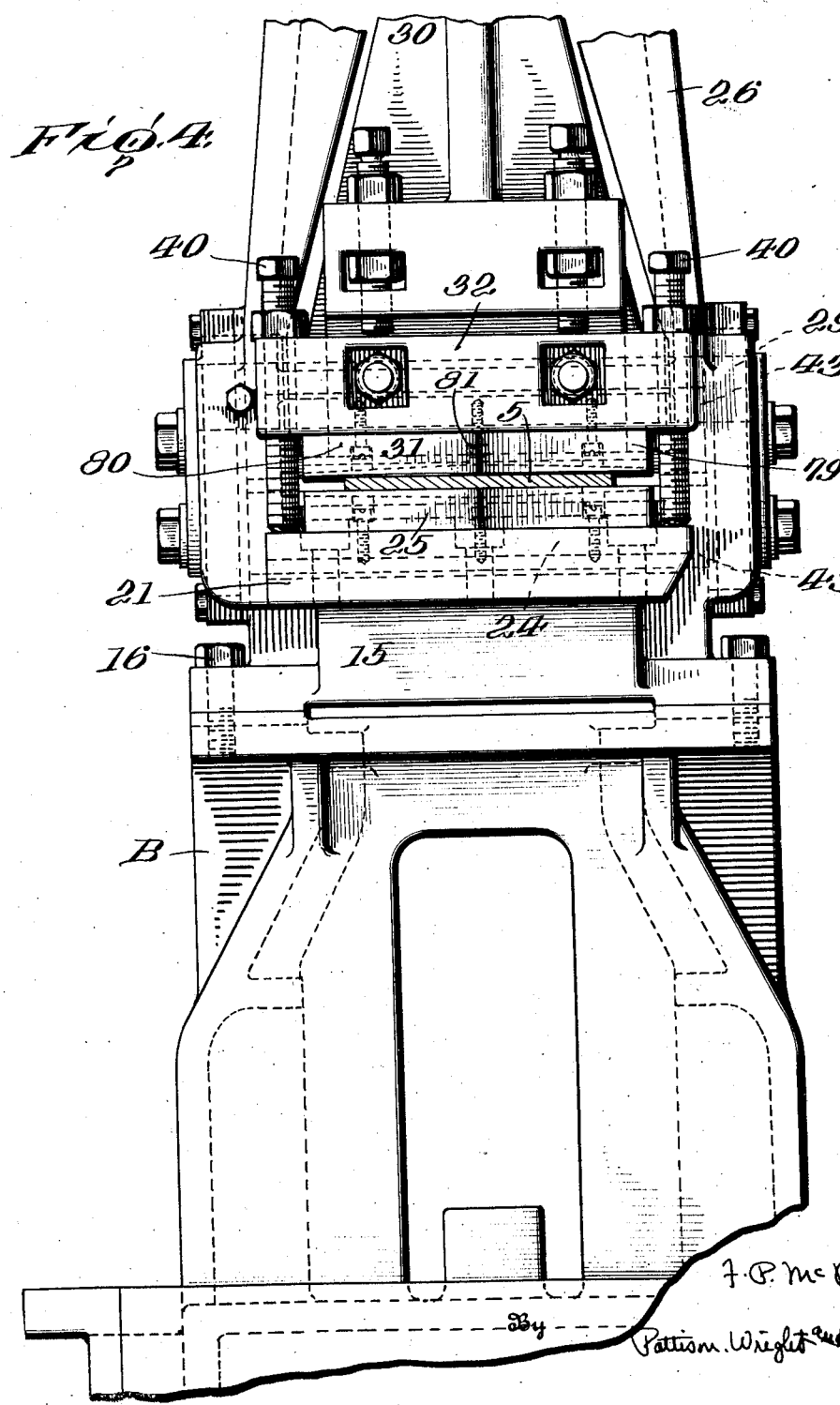

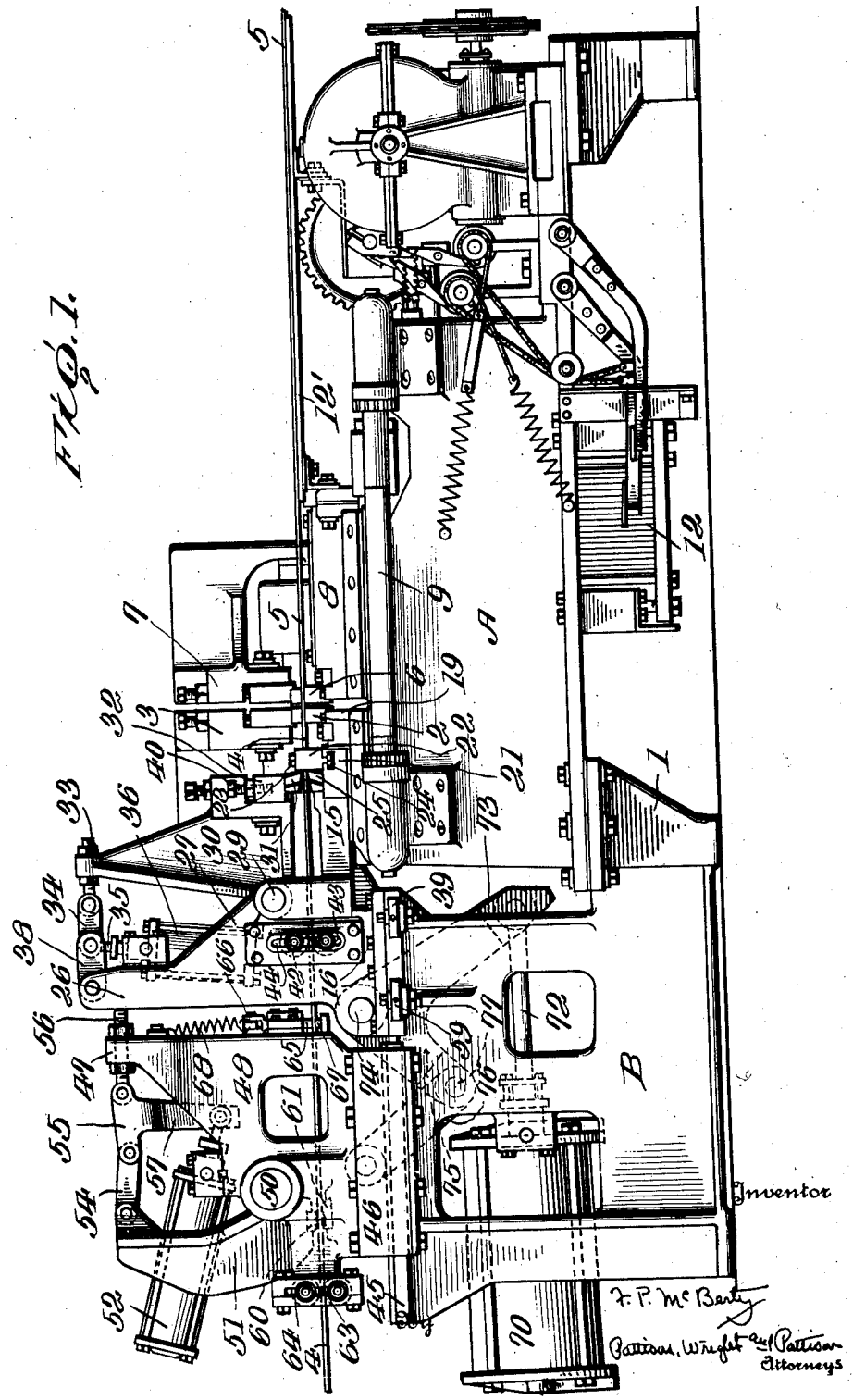

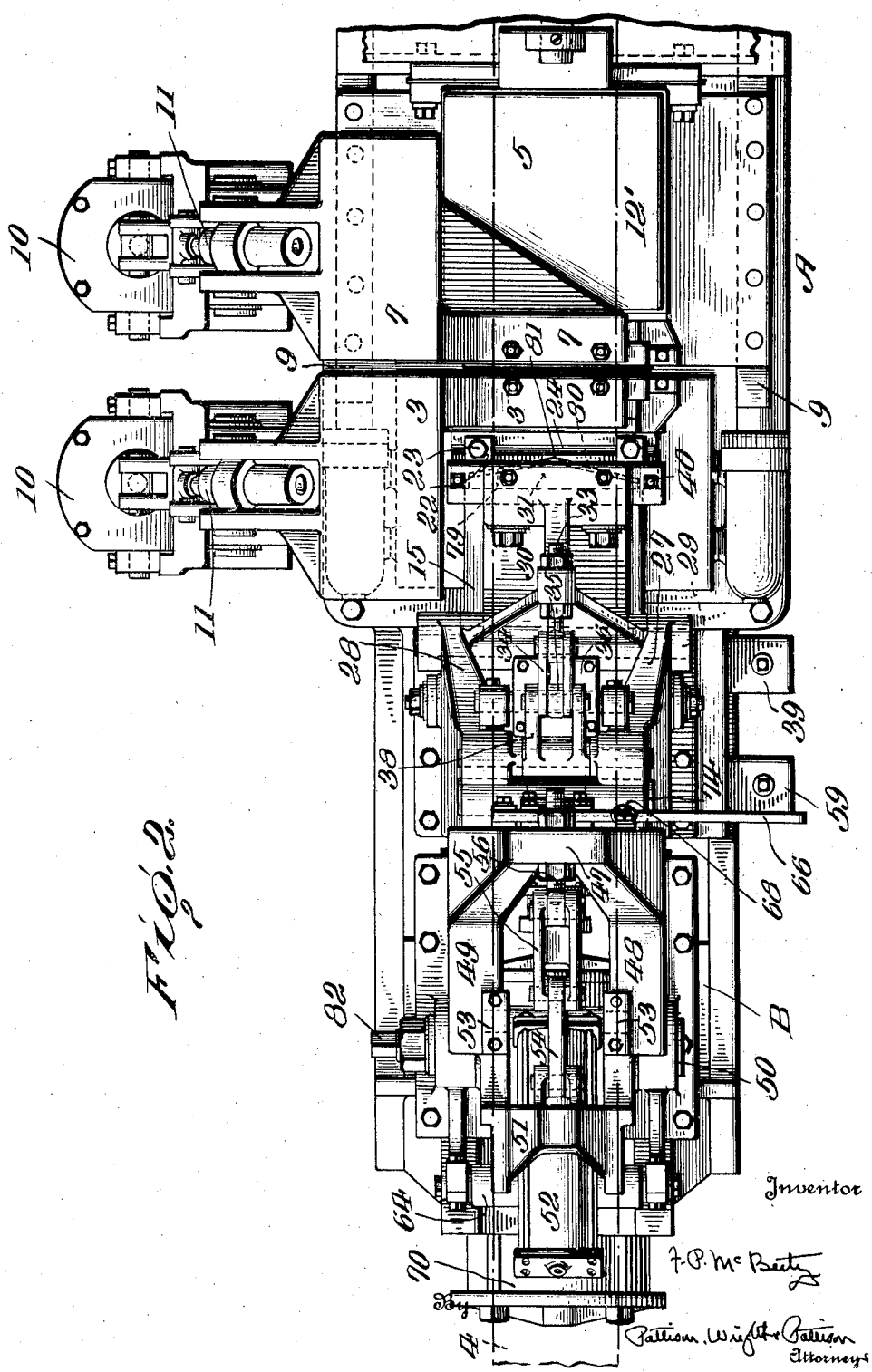

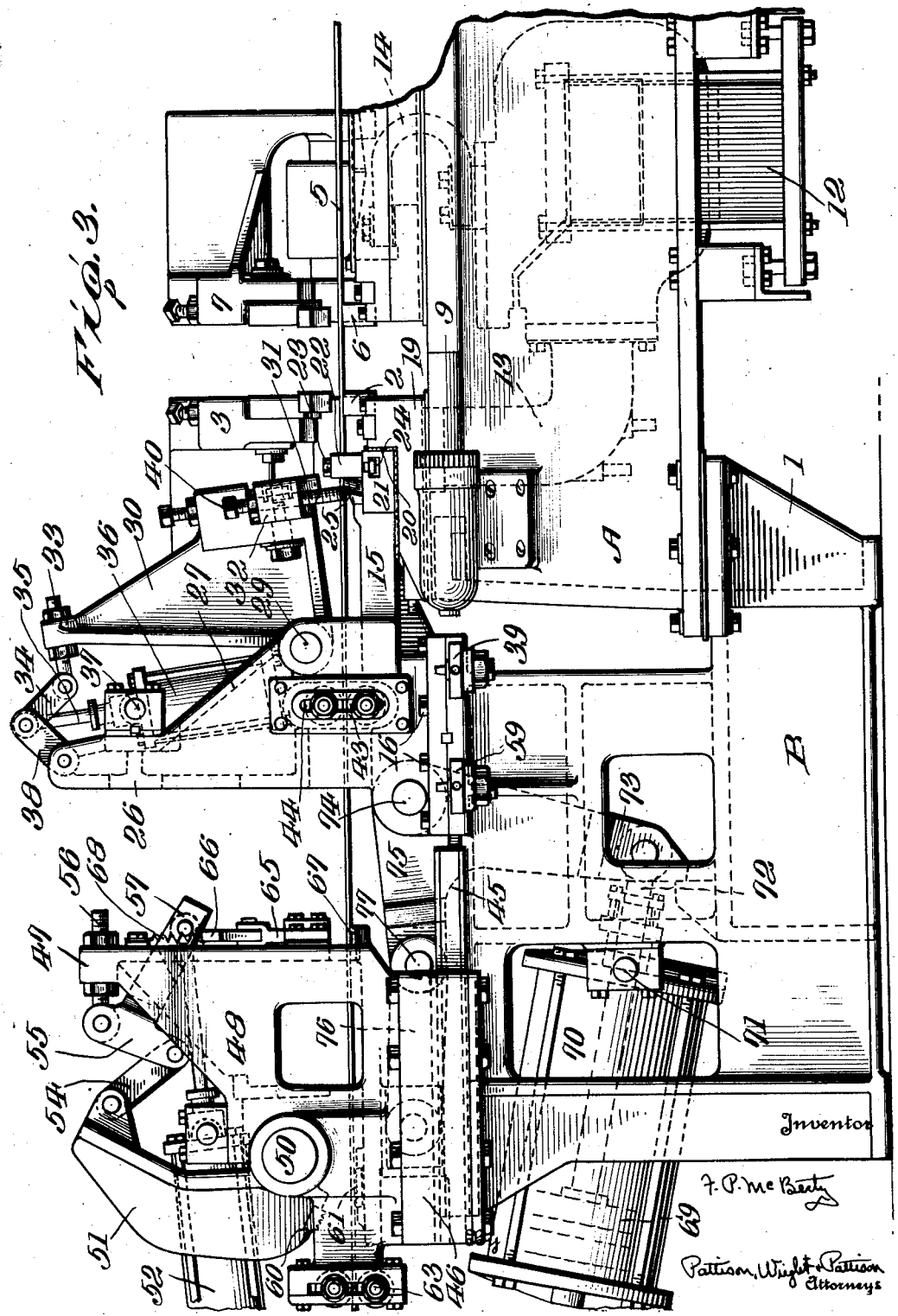

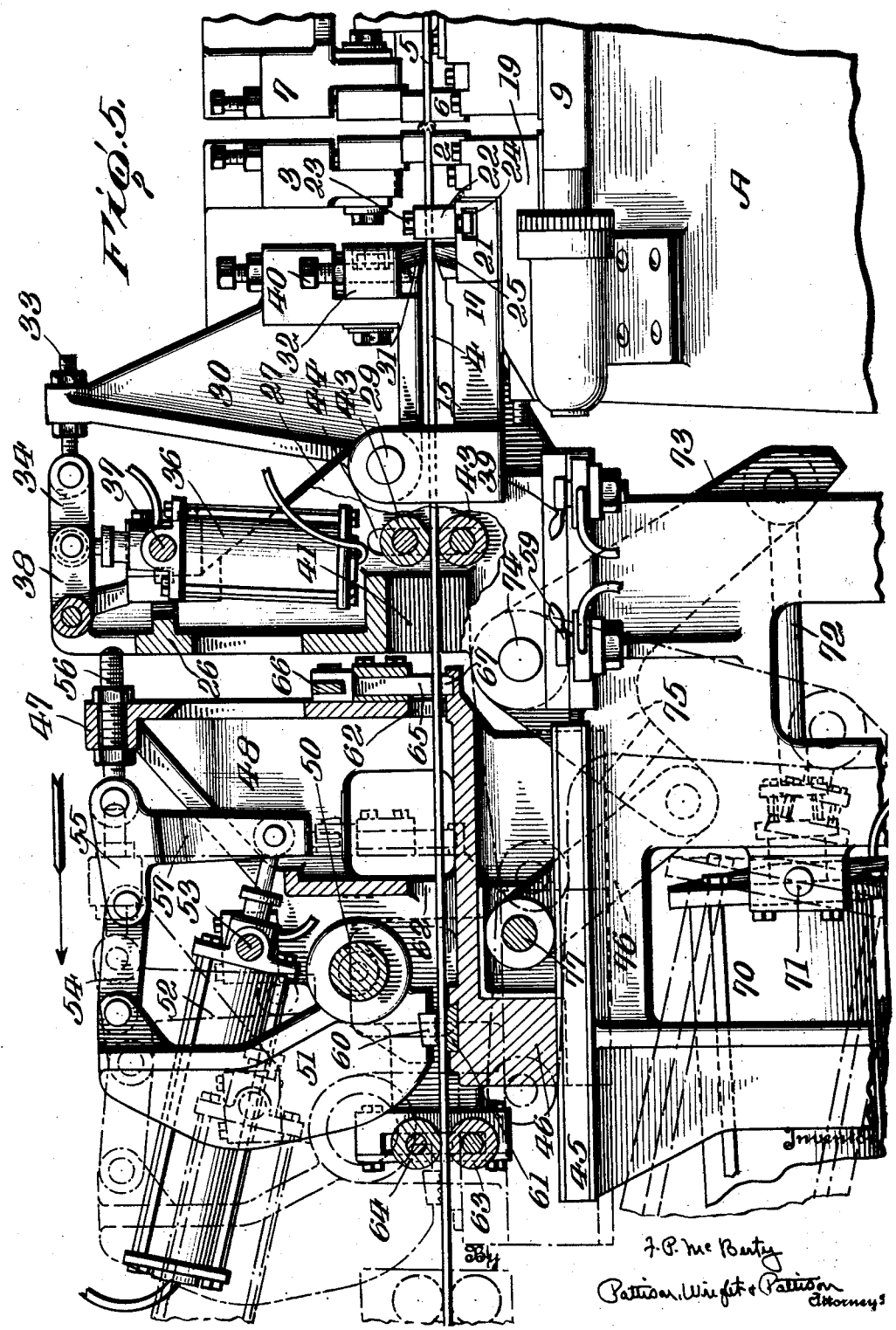

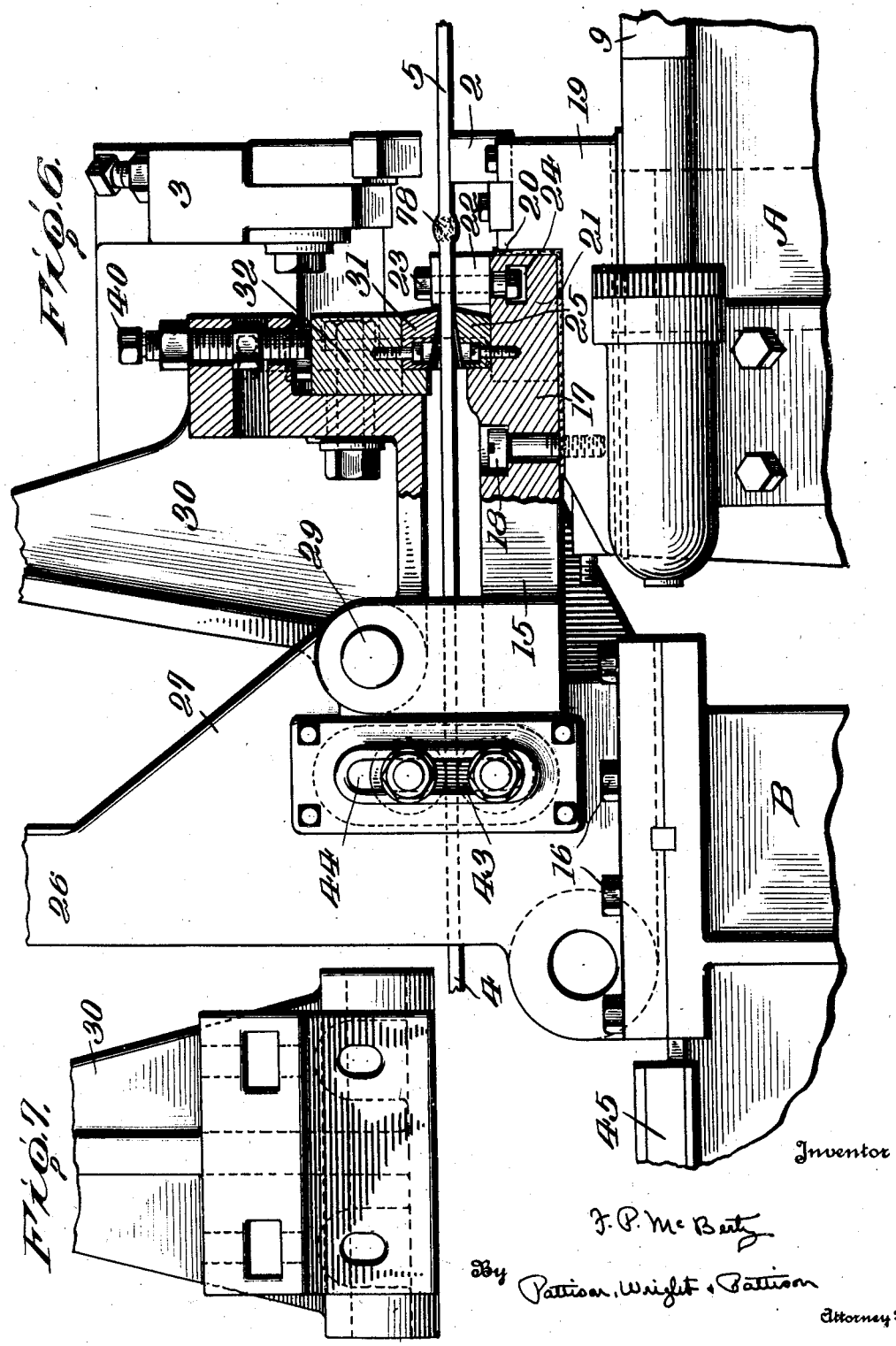

Nov. 17, 1931.  F. P. McBERTY  1,832,719
COMBINED ELECTRIC WELDER AND FLASH STRIPPER
Filed Aug. 7, 1930  8 Sheets-Sheet 7
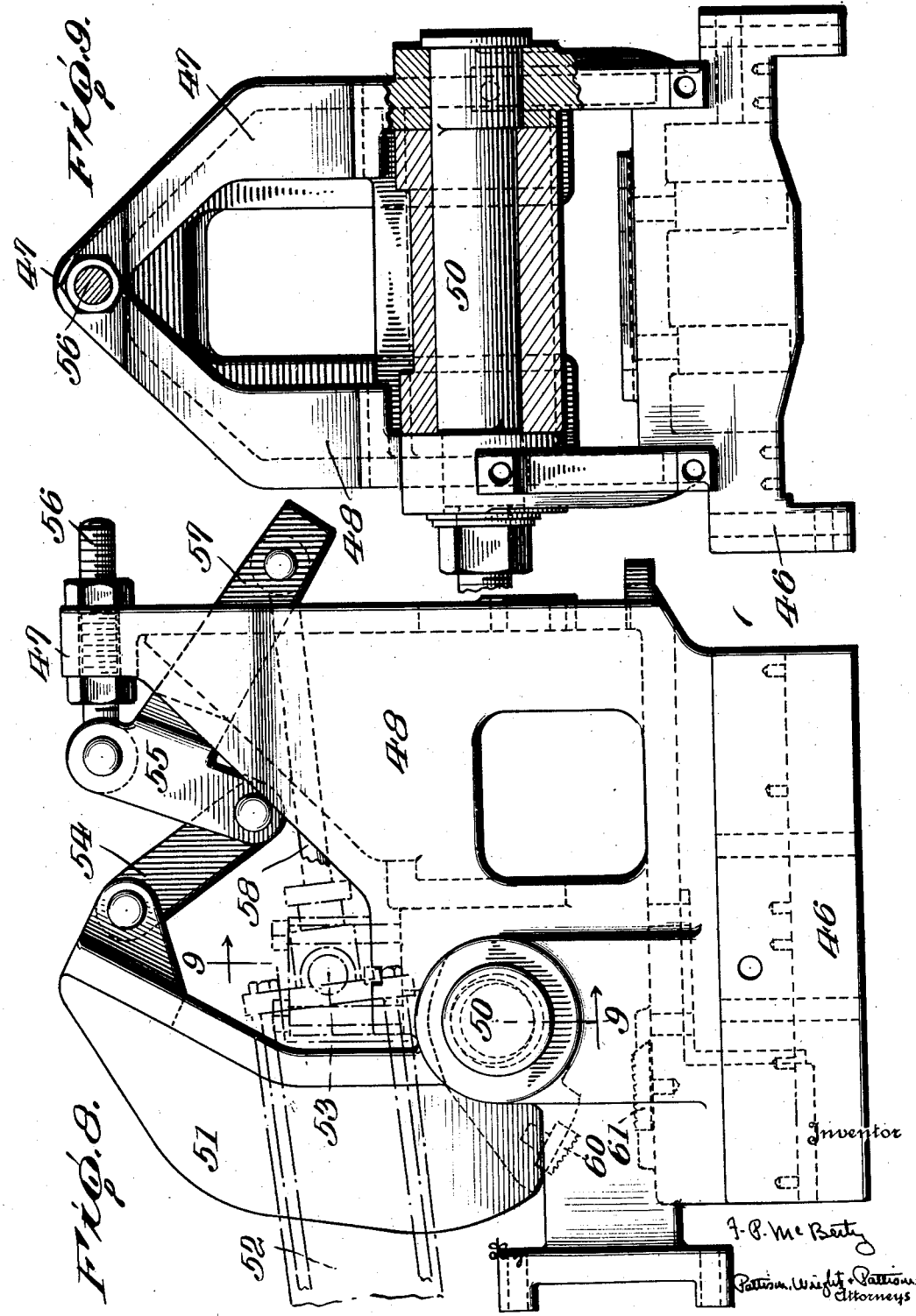

Nov. 17, 1931. F. P. McBERTY 1,832,719
COMBINED ELECTRIC WELDER AND FLASH STRIPPER
Filed Aug. 7, 1930 8 Sheets-Sheet 8
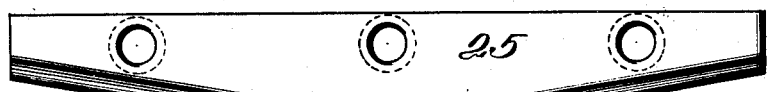
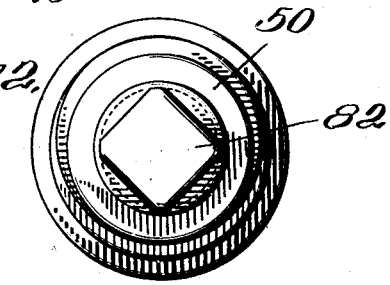
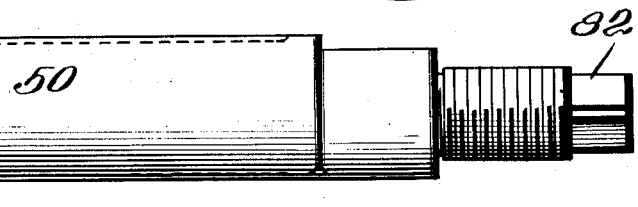
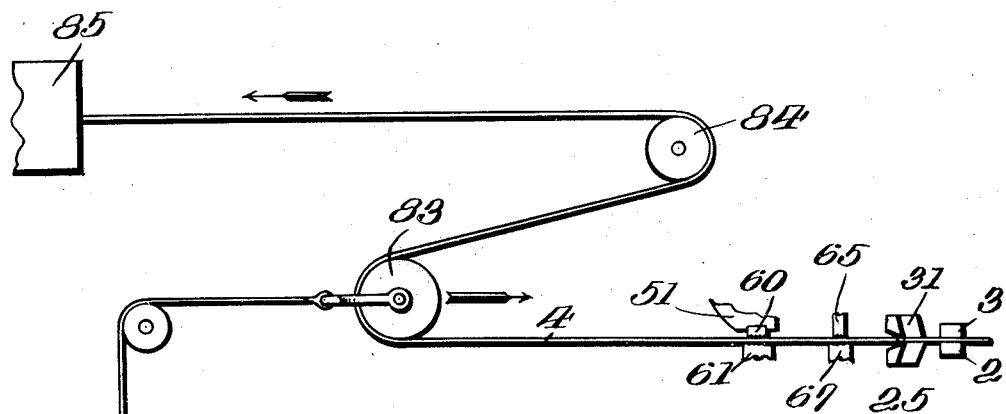
Inventor
F. P. McBerty
By Pattison, Wright & Pattison
Attorneys Patented Nov. 17, 1931

1,832,719

UNITED STATES PATENT OFFICE

FRED P. McBERTY, OF WARREN, OHIO

COMBINED ELECTRIC WELDER AND FLASH STRIPPER

Application filed August 7, 1930. Serial No. 473,610.

This invention relates to an improved combined electric welder and flash stripper which has been conceived for the purpose of butt welding together the ends of a continuously moving strip of material and thereafter removing from said strip the rough edges of flash which the welding operation leaves on the upper and under sides of the material at the point of the weld.

One method of manufacturing hollow tubing or piping is to form the same from a continuous strip of constantly moving material and after forming or making the pipe to cut the same into the desired lengths. In order to obtain an integral continuous piece of material it is necessary to fasten together the ends of strips of various lengths and the present machine has been conceived to accomplish this purpose by butt welding the ends of the strips together.

In the completed pipe the inner and outer surfaces must be smooth and accordingly it becomes necessary to remove from the strip the flash or burr which is the result of the welding operation which joins the ends of the strips together, and to acomplish this result the present machine includes in addition to the electric welder a flash stripper and the construction is such that the welding and stripping operation can be made while the strip is being continuously fed to either the pipe making machine or to a heating furnace or a pickling bath or some like step in the manufacture of the strip into the pipe tubing or other article.

Although the invention is above described as being particularly applicable for use in connection with pipe or tube manufacture, it will be readily apparent that the principle of operation of the machine and the machine itself could be applied and used for other purposes without departing from the spirit of the invention as set forth in the following description and accompanying claims.

From the foregoing it will be seen that the primary object of the invention is the provision of a new and improved combined electric welder and stripper of a construction which makes its use possible with either idle or moving work or material.

A further object of the invention is the provision of a stripper of a novel construction to be used in combination with a welding machine.

A still further object of the invention is the provision of a novel form of shear as a part of the stripper.

A still further object of the invention is the provision of a movable clamp of an improved and novel construction for use in conjunction with the shears of the stripper.

Other objects, novel features of construction and improved results of the invention will appear from the following description and accompanying drawings.

In the drawings:

Figure 1 is a view in side elevation of the combined welder and stripper.

Fig. 2 is a top plan view of the machine.

Fig. 3 is a slightly enlarged view in side elevation of the stripper and the welding electrodes of the welding machine, the parts being in different positions than is illustrated in Figure 1 of the drawings.

Fig. 4 is a fragmentary view in end elevation looking into the shearing end of the stripper.

Fig. 5 is a view similar to Figure 3, a portion of the figure being broken away and shown in vertical section.

Fig. 6 is an enlarged detail view in elevation of the stripping shears, a portion of the view being in vertical section.

Fig. 7 is an enlarged detail view looking at the lower end of the rocking arm which carries the movable shears.

Fig. 8 is an enlarged detail view in side elevation of the material clamp and puller.

Fig. 9 is a vertical sectional view taken on the line 9—9 of Figure 8 looking in the direction indicated by arrow.

Fig. 10 is a top plan view of one of the shears.

Fig. 11 is an end view of one of the shears.

Fig. 12 is an end view of the cam pin upon which the swinging clamp and puller is pivotally mounted.

Fig. 13 is a side view of the cam pin appearing in Figure 12.

Fig. 14 is a diagrammatic lay-out illustrating the manner in which the material continues to progress during the welding and stripping operation of the machine.

By reference to Figure 1 of the drawings it will be seen that A indicates the base of a welding machine and B indicates the base of a flash stripper and that the flash stripper is immediately adjacent the delivery end of the welder and that its legs 1 are bolted to and support the adjacent end of the welder base so that the two machines are rigidly secured to one another in their proper respective positions.

It is not thought necessary to go into any detailed description of the butt welding machine as butt welders and their constructions are now well known in the art and to the trade.

Attention is directed however to the fact that at the end of the welding machine adjacent the stripper there is provided a fixed electrode 2 which has cooperating with it a vertically swinging clamp 3. It is intended that the trailing end of the leading material or strip which has been designated as 4 be clamped between this electrode and clamp while the leading end of the trailing material or strip designated at 5 is clamped between the electrode 6 and the swinging clamp 7. As is common practice in respect to butt welding machines the electrode 6 and its clamp 7 are movable towards and away from the electrode 4 and its clamp 3 for the purpose of moving the ends of the material into abutment under pressure to effect the butt weld desired.

In the present instance the electrode 6 and the clamp 7 are carried by a base 8 which is movable on the slides 9 extending longitudinally of the welding machine at either side thereof.

As the machine appears in Figure 1 of the drawings the mechanism for turning on and off the welding current and for moving the electrode 6 and its clamp 7 towards the fixed electrode to bring about the welding operation appears to the right hand side of this figure of the drawings and as this particular mechanism forms no specific part of the present invention no detailed description of it will be given.

As the ends of the material are brought into abutment under considerable pressure it is necessary that the material be clamped upon the electrodes 2 and 6 tightly to prevent slippage and to this end these clamps can be hydraulic or air actuated pistons at one side of the machine which by reference to Figure 2 it will be seen move in suitable cylinders 10 and are connected to the clamps 3 and 7 by suitable toggle arrangements which are designated as an entirety by the numerals 11. These hydraulic or air actuated pistons and toggles swing the clamps upon suitable pivotal supports.

It is desirable that the receiving end of the welding machine be clear to permit the passage of the material and to this end the receiving end of the machine is provided with a bed plate 12' and the operating mechanism for the welding machine is either entirely below or to one side of this bed plate. The material 5 coming into the machine passes over the bed plate to have its leading end clamped upon the welder electrode 6.

A suitable transformer 12 provides welding current for the machine, and by reference to Figure 3 of the drawings it will be seen that this current is carried to the electrodes 2 and 6 by suitable leads 13 and 14.

At the end of the stripper adjacent the welder a stationary bed plate 15 is provided which is bolted as at 16 to the stripper base B while it has an extending end 17 (see Figure 6) bolted as at 18 to the portion 19 of the welder which carries the electrode 2. Between the end 17 of the bed plate and the vertical shoulder 20 of the electrode carrier 19 is positioned a block 21 carrying at its opposite ends and at opposite sides of the welding machine vertical guides 22 to act as edge guides for the material as it passes from the welding machine to the stripper shears. Due to the bolts 23 and the slotted guideway 24 in the block 21 these vertical guides are adjustable transverse the machine so that they can be properly positioned to guide materials of different widths.

The end 17 of the bed plate 15 of the stripper carries a removable shear 25 the upper cutting edge of which is in the same horizontal plane with the top of the welder electrode 2.

At the end of the bed plate 15 remote from the shear 25 the plate is provided with an upwardly extending arm 26 which has two projecting wings 27 and 28 which are in separated parallel relation and extend towards the welding machine. Pivotally supported as at 29 between these wings there is a rock arm 30 which at its lower end is removably and adjustably carried a shear 31 adapted to cooperate with the shear 25.

As will be readily apparent from Figure 6 of the drawings a removable and adjustable block 32 is carried in the lower end of this rock arm and the shear 31 is removably attached to this block, thus permitting the necessary adjustment of the shear 31 in respect to the shear 25 and to also permit the removal and replacement of a new shear readily and quickly.

At its upper end the rock arm 30 is provided with an adjustable screw 33 to which is pivotally attached a link 34 which in turn is pivotally attached to the piston rod 35 of a piston within the cylinder 36 which cylinder is pivotally supported as at 37 to an outwardly struck portion of the arm 26. A second link 38 is also pivotally attached to the upper end of the piston rod and to the upper end of the arm 26.

The result of this construction is that as the piston is moved within the cylinder 36 the rock arm 30 is oscillated upon its pivotal support 29 so that the shear 31 can be moved towards and away from the shear 25 as the desire may be.

It is intended that air under the control of the operator of the machine through a valve 39 be delivered to the desired end of the cylinder 36 to rock or move the rock arm 30 in the desired direction, and to prevent the movable shear 31 from too tightly clamping the material between the shears, adjustable stop pins 40 are provided which engage the block 21 when the shear 31 has been lowered to the desired distance from the surface of the material.

In Figure 3 of the drawings the shears are shown in open position while in Figure 5 they are shown in closed or operating position and from these figures of the drawings the necessity for the pivotal support of the cylinder 36 will be apparent because it will be seen that the cylinder rocks when the rock arm 30 is rocked upon its pivotal support. The arrangement of the links 34 and 38 is such that when the shears are in proper position for work the links are on dead center so that the rock arm 30 is locked against movement until the operator of the machine delivers air to the opposite side of the piston within the cylinder to effect a release of the links and an upward movement of the upper shear.

The arm 26 is provided with a passageway 41 for the material and immediately in front of this passageway there are arranged two rollers 42 and 43 between which the material is guided and these rollers are adjustable in the vertical slots 44 in the wing portions 27 and 28 of the arm 26.

Immediately behind that portion of the stripper carrying the shears the base B of the stripper is provided with side slides 45 upon which slides a carriage the base of which is indicated at 46. This carriage has an upward vertically extending arm 47 which has rearwardly extending wing portions 48 and 49 which are in separated parallel relation and pivotally supported upon a cam pin 50 spanning these arms there is a rock or oscillating clamp arm 51 which arm, as readily appears in Figure 9 of the drawings, is bifurcated and through this bifurcated arm extends a cylinder 52 which at its inner end is pivotally supported as at 53 upon the wing portions 48 and 49 of the vertical arm or standard 47 of the carriage.

To the upper end of the rock clamp arm 51 is pivotally connected a link 54 which in turn is pivotally connected to a link 55 pivotally attached to the adjustable bolt 56 in the upper end of the vertical arm or standard 47. The link 55 has a downwardly extending arm 57 which is pivotally attached to the extending rod 58 of a piston positioned within the cylinder 52. It is intended that air be delivered to the desired end of the cylinder 52 under the control of a valve 39 conveniently positioned to the hand of the operator of the machine. Through the manipulation of this valve the operator can move the piston in the desired direction to rock the clamp arm up and down.

In its lower end the rock clamp arm 51 is provided with a roughened inset 60 which is adapted to cooperate with the roughened plate 61 carried by the carriage base 46. This plate 61 is in the same horizontal plane with the welder die 2 and the material which extends through a suitable opening 62 in the wall of the vertical arm or standard 47 rests upon this plate and when the rock arm is in its lowered position as indicated in Figure 5 of the drawings the materials is tightly clamped between the plate 61 and the inset 60 of the clamp arm.

Extending transverse the outer end of the carriage 46 are two rollers 63 and 64 through which the material passes from the stripper.

On its front face the vertical arm or standard 47 carries a manual clamp 65 which is operated through the medium of the hand lever 66 and cooperates with the clamp plate 67 carried by the reciprocal carriage 46. This clamp is held upwardly in an unclamped position by reason of a spring 68.

The carriage 46 is reciprocated upon its slideway by a piston 69 within the cylinder 70 which is pivotally supported as at 71 within the base B of the stripper. This piston has an elongated rod 72 which is pivotally connected to one arm 73 of a bell crank lever which lever is pivotally attached as at 74 to the vertical standard 26 and has its other arm 75 pivotally attached to a link 76 which link is in turn pivotally attached as at 77 to the carriage 46.

Fluid or air under pressure to the desired side of the piston within the cylinder 70 is under control of the operator of the machine by a conveniently placed valve 59.

In removing the flash or burr from the material, which flash is indicated in the drawings by the numeral 78, it is desirable that it be removed by a shearing operation which is not exactly transverse the flash and to accomplish this the shears 25 and 31 are made in the form indicated in Figures 10 and 11 wherein it will be seen that the shear blades are V-shaped in that the two blade portions 79 and 80 are arranged at acute angles to one another to meet at a point 81. Consequently the flash is cut from the material in a shearing operation which cuts the flash from the outer edges of the material in a direction towards the center of the material or strip.

When the material is clamped by the clamp 60 it is not desirable to have the clamp 60 move to a position past dead-center for the reason that the material would possibly be pressed out of shape by being clamped so tight, and furthermore it would be difficult to release the clamp. Therefore the pressure with which the clamp clamps the material is adjustable and to provide means for this adjustability the pivot pin 50 for the clamp is in the form of a cam, as clearly indicated in Figure 12, and by the rotation of this pin the pressure with which the clamp engages the work is readily adjustable to the desired degree. To facilitate the rotation of the cam pin one end is squared as indicated at 82 so that it can be readily engaged by a wrench or the like.

Mention has been made of the fact that the material continues to move during the welding and stripping operation and the manner of providing for this is indicated in Figure 14 of the drawings where it will be seen that the material 4 after leaving the machine passes over a floating pulley 83, a stationary pulley 84 and then on to a furnace, pickling vat or pipe forming machine which is represented diagrammatically at 85.

With this construction when the material is stopped in the machine to be operated upon by the welder and stripper the floating pulley moves towards the stripper in the direction indicated by arrow, thus permitting the material 4 to continue to be fed to the furnace, pickling vat or pipe forming machine notwithstanding the fact that the material in front of the floating pulley 83 is at a standstill in the machine.

Having described the invention in detail a concise statement of the operation will be given.

*Operation*

When the trailing end 4 of the leading material or strip reaches the fixed electrode 2 the movement of the material is stopped preferably by the manual hand clamp 65 and as soon as the trailing end is properly positioned on the electrode the operator causes the clamp 3 of the welder to clamp the trailing edge of the material upon the electrode and the operator of the machine also manipulates the valve 39 to deliver air to the cylinders 36 and 52 with the result that the upper shear moves downwardly against the material in a proper position to accomplish the flash stripping operation and the movable clamp arm 51 swings so as to clamp the material between the clamp plates 60 and 61.

The leading end of the next trailing piece of material or strip is then brought into proper position upon the movable electrode 6 and clamped thereon by the clamp 7 and when properly positioned and clamped the operator of the machine performs the necessary steps to bring about the butt welding of the leading and trailing ends of the material together. This welding operation raises on both sides of the material a burr 78 which is clearly indicated in Figure 6 of the drawings.

As soon as the welding operation has been completed the machine operator releases the clamps 3 and 7 of the welder and then manipulates the valve 59 to deliver air to the cylinder 70 on the proper side of the piston to cause the carriage 46 to move in a direction away from the shears. As the clamp 51 is tightly in engagement with the material the carriage and the material move together, with the result that the material is pulled through the stripping shears and the shears 25 and 31 remove the flash from both sides of the strip.

As soon as the stripping operation has been performed the operator reverses the position of the valve 39, thus releasing the strip from engagement of both the upper shear and the clamp and the material continues to move through the machine in the normal manner.

The valve 59 is then manipulated to return the carriage to a position adjacent the shears so that the machine will be ready for another operation when the trailing end of the material or strip just welded reaches the welding machine.

A skillful operator can accomplish the welding and stripping operation in a remarkably short time and consequently the loop made in the material in its path of travel over the floating pulley need not be exceedingly large to assure that a continuous feed of the material is had at the furnace, pickling vat or pipe former.

With a machine of the type described it will be seen that it is possible to butt weld and flash strip a continuously moving sheet of material by means of a stationary machine.

The present machine is illustrated and described as being fixed and provision is made for the continuous movement of the strip during the welding and flash stripping operations. Attention is called to the fact, however, that the machine could be mounted on wheels and travel along a track at the same speed that the strip travels and thus the welding and flash stripping operations could be made upon the strip while it is moving and the mechanism illustrated in Fig. 14 of the drawings for providing slack in the strip could be eliminated.

Having thus described my invention what I claim and desire to secure by Letters Patent is:

1. In combination with an electric welding machine for butt welding the ends of material together, a flash stripper through which said material passes after the welding operation and comprising, a shear in engagement with the under side of said material, a shear adapted to engage the upper side of said material and clamp the material under pressure against said lower shear, and means forming part of said stripper adapted to engage said material and pull the same through said shears for removing the flash from both sides of said material.

2. In combination with an electric welding machine for butt welding the ends of material together, a flash stripper through which said material passes after said welding operation comprising, a shear in engagement with the under side of said material, a shear thereabove and adapted to be moved into engagement with the upper side of said material to clamp the material between the shears, means for engaging the material, said clamp movable towards and away from said shear, and mechanism to move said means for pulling the material through the shears to remove the flash from both sides of said material.

3. In combination with an electric welding machine for butt welding the ends of material together, a flash stripper through which said material passes after the welding operation, said stripper comprising a shear engaging the under side of the material, a movable shear thereabove adapted to engage the upper side of the material, a clamp for clamping the material, means to actuate said clamp, said clamp movable towards and away from said shears, and means to move said clamp to pull said material through said shears for stripping therefrom the flash caused by said welding operation.

4. A combined welding and flash shearing machine for operation upon continuously moving material, comprising means to butt weld the material together, means to remove from said material the flash caused by said welding operation, and means to permit the continued movement of the material behind said machine during the welding and flash shearing operations.

5. In combination with an electric welding machine for butt welding material together, a flash stripper through which said material passes after the welding operation, said stripper having a pair of shears for engaging the opposite sides of said material, a carriage movable on said stripper and carrying means for engaging the material in the stripper, and means to move said carraige to pull the material through the shears for removing the flash raised on the material by the welding operation.

6. In combination with an electric welding machine for butt welding material together, a flash stripper through which said material passes after the welding operation, said stripper having a fixed shear for engaging the under side of the material and a movable shear for engaging the upper side of the material above said fixed shear, a carriage movable on said stripper and carrying a clamp for engaging the material as it passes through the stripper, means for simultaneously operating the movable shear and the movable clamp to bring them into engagement with the material, and means to move said carriage for pulling the material through the shears for removing the flash raised on the material by the welding operation.

7. In combination with an electric welding machine for butt welding material together, a flash stripper through which said material passes after the welding operation, said stripper comprising a base, a fixed shear on said base adjacent the welding machine and in engagement with the under side of the material, a pivotally mounted shear above said fixed shear and movable into engagement with the upper side of the material, a carriage slidable upon the stripper base at the end remote from the welder and carrying a pivotally mounted clamp, toggle mechanisms for operating the movable shear and the clamp for moving them into engagement with the material, pistons for operating said toggles, and pressure means under the control of a single valve for simultaneously operating said toggles to move the movable shear and clamp into engagement with the material, a toggle for operating the carriage, a piston for operating the carriage toggle, and pressure means for operating said last named piston for operating said carriage toggle to move the carriage to pull the material past the shears for removing the flash raised on said material by said welding operation.

8. In combination with a welding machine, a flash stripper comprising a shear and a clamp plate over which said material passes after the welding operation, a shear above said material for cooperation with said first named shear and a clamp for cooperation with said clamp plate, said clamp plate and said clamp movable towards and away from said shears, and means to move said clamp and its clamping plate away from said shears to pull the material through the shears, for the purpose described.

9. In combination with an electric welding machine for welding material together, a flash stripper through which said material passes after the welding operation, said stripper having a shear for engaging the under side of the material and a movable shear for engaging the upper side of the material thereabove, a movable carriage carrying a clamp plate and a movable clamp mounted upon said carriage for cooperation with said clamp plate, toggles for operating said movable shear and said movable clamp, means for operating said toggles, and said toggles assuming a dead-center position when the movable shear and the movable clamp are in engagement with the material to lock the same in said positions, and means to move said carriage to pull the material through the shears, for the purpose described.

10. In a machine of the character described, a pivotally mounted clamp arm, a pivotal support for said clamp arm comprising a cam pin, and said cam pin rotatably mounted whereby the arc of swing of the clamp arm is adjustable.

11. In combination with an electric welding machine for butt welding the ends of material together, a flash stripper through which said material passes after the welding operation, said stripper comprising a pair of shear blades adapted to engage the upper and lower faces of said material, the upper shear blade being pivotally mounted, a toggle for operating said upper shear, a pressure operated piston for operating said toggle, a carriage slidable upon the stripper towards and away from the said stripper blades, a clamp pivotally mounted upon said carriage for clamping the material thereon, a toggle for operating said clamp, a pressure operated piston for operating said toggle, a fluid pressure means under the control of a single valve for delivery to said toggle operating piston, said toggle assuming a dead center position when the shear blade and the clamp are in engagement with the material to lock the same in said positions, a toggle for operating said movable carriage, a pressure operated piston for operating said toggle, a pressure means for operating said last-mentioned piston to cause the carriage to move away from or towards the shear, for the purpose described.

12. A combined welding and flash shearing machine comprising means to butt-weld material together, a pair of V-shaped shear blades between which said material passes to remove therefrom the flash caused by said welding operation, the legs of said blades being arranged in separated parallel alignment with the apexes of the blades also in alignment, and means to move said material through said shears to accomplish said flash removal.

13. A combined welding and flash shearing machine comprising means to weld material together, shears for removing from the material the flash caused by said welding operation, means to move said material through said shears, said shears comprising a pair of V-shaped shear blades, the legs of said blades comprising the cutting edges of the shears and adapted to engage the material at opposite sides thereof as the material is moved between them.

In testimony whereof I hereunto affix my signature.

FRED P. McBERTY.

DISCLAIMER 1,832,719.—*Fred P. McBerty*, Warren, Ohio. COMBINED ELECTRIC WELDER AND FLASH STRIPPER. Patent dated November 17, 1931. Disclaimer filed May 29, 1940, by the assignee, *The Federal Machine & Welder Company*.
Hereby disclaims claims 1, 4, 12, and 13 of said patent.
[*Official Gazette June 25, 1940.*]